United States Patent
Weitzman et al.

(10) Patent No.: US 10,009,280 B2
(45) Date of Patent: Jun. 26, 2018

(54) METHOD AND APPARATUS FOR PROVIDING AN EFFICIENT MULTI-CLIENT ACCESS

(71) Applicant: Huawei Technologies Co., Ltd., Shenzhen (CN)

(72) Inventors: Avi Weitzman, Munich (DE); Doron Ezri, Munich (DE); Shimi Shilo, Munich (DE); Fuqing Sun, Nanjing (CN); Wei Ruan, Suzhou (CN); Ronghu Fan, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 14/985,978

(22) Filed: Dec. 31, 2015

(65) Prior Publication Data

US 2016/0119239 A1  Apr. 28, 2016

Related U.S. Application Data

(63) Continuation of application No. PCT/EP2013/077466, filed on Dec. 19, 2013.

(51) Int. Cl.
| | |
|---|---|
| *H04L 12/851* | (2013.01) |
| *H04L 12/803* | (2013.01) |
| *H04W 16/04* | (2009.01) |
| *H04W 88/08* | (2009.01) |
| *H04W 72/04* | (2009.01) |
| *H04W 84/12* | (2009.01) |

(52) U.S. Cl.
CPC ............ *H04L 47/125* (2013.01); *H04L 47/24* (2013.01); *H04W 16/04* (2013.01); *H04W 72/04* (2013.01); *H04W 88/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2004/0260760 A1* | 12/2004 | Curnyn | H04W 88/06 709/201 |
| 2007/0201540 A1* | 8/2007 | Berkman | H04B 3/542 375/219 |
| 2008/0130541 A1 | 6/2008 | Kokku et al. | |
| 2011/0013608 A1 | 1/2011 | Lee et al. | |

(Continued)

OTHER PUBLICATIONS

Bhanage, G., et al., "SplitAP: Leveraging Wireless Network Virtualization for Flexible Sharing of WLANs," Globecom, IEEE Global Telecommunications Conference, Dec. 6, 2010, 6 pages.

(Continued)

*Primary Examiner* — Chi H Pham
*Assistant Examiner* — Shick Hom
(74) *Attorney, Agent, or Firm* — Conley Rose, P.C.

(57) ABSTRACT

An apparatus and a method for providing an efficient multi-client access in a WLAN, the method comprising the step of: when the number of clients exceeds a threshold, creating at least two virtual access points (VAP1, VAP2, VAP3); load balancing by distributing workloads across the created at least two virtual access points; and dynamically allocating at least one quality of service parameter (e.g., timeslots, AIFS, TXOP, maximum and minimum contention window) to each of the created at least two virtual access points.

14 Claims, 7 Drawing Sheets

(56) References Cited

U.S. PATENT DOCUMENTS

| | | | | |
|---|---|---|---|---|
| 2013/0010597 A1* | 1/2013 | Liu | ...................... | H04W 28/16 |
| | | | | 370/235 |
| 2013/0021962 A1* | 1/2013 | Hu | ....................... | H04W 48/20 |
| | | | | 370/315 |
| 2013/0052989 A1* | 2/2013 | Mahalingam | ......... | H04W 12/06 |
| | | | | 455/411 |
| 2013/0094486 A1* | 4/2013 | Bhanage | ............... | H04W 88/08 |
| | | | | 370/338 |
| 2013/0223216 A1* | 8/2013 | Greene | ................. | G06F 9/5083 |
| | | | | 370/230.1 |
| 2014/0029425 A1* | 1/2014 | Rege | ................. | H04W 28/0215 |
| | | | | 370/235 |

OTHER PUBLICATIONS

Bianchi, G., "IEEE 802.11—Saturation Throughput Analysis," IEEE Communications Letters, vol. 2, No. 12, Dec. 1998, pp. 318-320.

Bianchi, G., "Performance Analysis of the IEEE 802.11 Distributed Coordination Function," IEEE Journal on Selected Areas in Communications, vol. 18, No. 3, Mar. 2000, pp. 535-547.

Ferre, P., et al., "Throughput Analysis of IEEE 802.11 and IEEE 802.11e MAC," Wireless Communications and Networking Conferences, Jul. 19, 2004, pp. 784-788.

Foreign Communication From a Counterpart Application, PCT Application No. PCT/EP2013/077466, International Search Report dated Oct. 9, 2014, 6 pages.

Foreign Communication From a Counterpart Application, PCT Application No. PCT/EP2013/077466, Written Opinion dated Oct. 9, 2014, 7 pages.

\* cited by examiner

METHOD AND APPARATUS FOR PROVIDING AN EFFICIENT MULTI-CLIENT ACCESS

CROSS-REFERENCE TO RELATED APPLICATIONS

This application is a continuation of International Application No. PCT/EP2013/077466, filed on Dec. 19, 2013, which is hereby incorporated by reference in its entirety.

TECHNICAL FIELD

The present invention relates to wireless multi-client networking, and particularly to a method and an apparatus for providing an efficient multi-client access.

BACKGROUND

Wireless communication systems are racing towards better data rates, more clients per cell and higher efficiency in given deployment scenarios. For example in the high-end wireless fidelity (Wi-Fi) market, i.e. electronic devices exchange data or connect to the internet wirelessly using radio waves, effort is made to design the highest performance access-point.

One of the key technologies to achieve such goals is time division duplexing (TDD) between the clients of a cell in wireless multi-client networking. This technique allows an access point to serve a large number of clients while maintaining the efficiency.

US 2008/0130541 A1 describes a method and a system for improving spatial reuse in a wireless local area network (WLAN) by per-client dynamic power management. Each access point of the WLAN associates each of its clients with a minimum power level.

According to the described method, a central controller of the WLAN generates a schedule for transmission at different power levels, and each access point varies its transmission power level based on the schedule. According to the described method, an access point transmits data packets, at the scheduled transmission power level, to clients associated with a minimum power level that is less than the scheduled power level.

SUMMARY AND DESCRIPTION

It is the object of the present invention to provide an improved technique for wireless multi-client networking.

This object is achieved by the features of the independent claims. Further implementation forms are apparent from the dependent claims, the description and the figures.

According to a first aspect, a method for providing an efficient multi-client access is provided, the method comprises the steps of creating at least two virtual access points (VAPs); load balancing by distributing workloads across the created at least two VAPs; and dynamically allocating at least one quality of service (QoS) parameter to each of the created at least two VAPs.

The present invention is based on a method to implement TDD which reduces collisions between clients and gives superior performance compared to the pure carrier sense multiple access (CSMA) with collision avoidance (CA), i.e. CSMA/CA in computer networking. This represents a network multiple access method in which carrier sensing is used, but the nodes attempt to avoid collisions by transmitting only when the channel is sensed to be "idle" according to certain algorithms used.

The invention is based on turning the Wi-Fi into a TDD scheme without employing point coordination function (PCF). PCF is a media access control (MAC) technique used in Institute of Electrical and Electronics Engineers (IEEE) 802.11-based WLANs. It resides in a point coordinator (also known as an access point) to coordinate the communication within the network. The concept of avoiding PCFs is advantageous as most clients do not support PCF.

The basic idea of the present invention is to innovatively use the VAP QoS capabilities. The basic idea of the invention is given by dividing each access point into a number of N VAPs. Further, dividing the stations or clients of the previous access point between the created VAPs using load balancing is conducted. Implementing TDD between the VAPs is performed. The solution increases the access point efficiency by decreasing a collision probability, increasing transmission (TX) time, i.e. increasing accumulation time for uplink.

The present invention can be employed for wireless networks and, in particularity, IEEE 802.11 networks. The present invention can further be employed in any wireless communications environment, including wireless data networks, wireless phone networks, and wireless input/output channels.

In a first possible implementation form of the method according to the first aspect, the distributing of workloads across the created at least two VAPs is achieved by adjusting a cell traffic load of each of the at least two VAPs.

The distributing of the workloads across the VAPs advantageously allows managing the traffic of the VAPs to ensure reliability and optimum over-the-air performance.

In a second possible implementation form of the method according to the first aspect as such or according to the first possible implementation form, the distributing of workloads across the created at least two VAPs is achieved by adjusting a number of access point clients per each of the at least two VAPs.

By adjusting a number of access point clients, efficient wireless network architecture is provided.

In a third possible implementation form of the method according to second possible implementation form of the first aspect as such, a threshold value is defined for the number of access point clients per each of the at least two VAPs.

This advantageously allows managing the traffic of the VAPs to ensure reliability and optimum over-the-air performance.

In a fourth possible implementation form of the method according to the third implementation form of the first aspect, for the case of a surpassing of the defined threshold value regarding the number of access point clients per each of the at least two VAPs a further VAP is created.

This advantageously allows tuning the network traffic system by modifying the virtual topology of the underlying physical infrastructure.

In a fifth possible implementation form of the method according to the first aspect as such or according to any of the preceding implementation forms of the first aspect, the dynamically allocating of the at least one QoS parameter comprises adjusting a time slot of one of the created at least two VAPs.

Thereby, in order to meet performance requirements, the adjusting of the QoS parameters allows improving the performance and the traffic management of the WLAN.

In a sixth possible implementation form of the method according to the first aspect as such or according to any of the preceding implementation forms of the first aspect, the dynamically allocating of the at least one QoS parameter comprises adjusting an arbitration inter-frame spacing of one of the created at least two VAPs.

This advantageously allows improving the distribution of traffic resources and provides an optimized routing and traffic management strategy of the WLAN.

In a seventh possible implementation form of the method according to the first aspect as such or according to any of the preceding implementation forms of the first aspect, the dynamically allocating of the at least one QoS parameter comprises adjusting a minimum contention window for one of the created at least two VAPs.

This advantageously allows tuning the network traffic system by modifying the QoS parameters.

In an eighth possible implementation form of the method according to the first aspect as such or according to any of the preceding implementation forms of the first aspect, the dynamically allocating of the at least one QoS parameter comprises adjusting a maximum contention window for one of the created at least two VAPs.

Thereby, in order to meet performance requirements, the adjusting of the QoS parameters allows improving the performance and the traffic management.

In a ninth possible implementation form of the method according to the first aspect as such or according to any of the preceding implementation forms of the first aspect, the dynamically allocating of the at least one QoS parameter comprises adjusting a transmission opportunity (TXOP) as an interval of time for one of the created at least two VAPs.

In a tenth possible implementation form of the method according to the first aspect as such or according to any of the preceding implementation forms of the first aspect, the dynamically allocating of the at least one QoS parameter to one of the at least two VAPs is conducted according to a priority value.

Thereby, in order to meet performance requirements, the adjusting of the QoS parameters allows improving the performance and the traffic management.

In an eleventh possible implementation form of the method according to the first aspect as such or according to any of the preceding implementation forms of the first aspect, the dynamically allocating of the at least one QoS parameter to one of the at least two VAPs is conducted according to a weight value.

In a twelfth possible implementation form of the method according to the first aspect as such or according to any of the preceding implementation forms of the first aspect, the dynamically allocating of the at least one QoS parameter to one of the at least two VAPs is conducted according to a load and performance value.

According to a second aspect, the invention relates to an apparatus for providing an efficient multi-client access, the apparatus comprising a creating unit configured to create at least two VAPs; a balancing unit configured to load balance by distributing workloads across the created at least two VAPs; and an allocating unit configured to dynamically allocate at least one QoS parameter to each of the created at least two VAPs.

According to a third aspect, the invention relates to an access point for use in a communication network comprising an apparatus according to the second aspect.

The methods, apparatuses, systems and devices described herein may be implemented as software in a digital signal processor (DSP) in a micro-controller or in any other side-processor or as hardware circuit within an application specific integrated circuit (ASIC) or in a field-programmable gate array (FPGA) which is an integrated circuit designed to be configured by a customer or a designer after manufacturing—hence field-programmable.

The invention can be implemented in digital electronic circuitry, or in computer hardware, firmware, software, or in combinations thereof, for example in available hardware of conventional mobile devices or in new hardware dedicated for processing the methods described herein.

LIST OF ABBREVIATIONS

AC Access Category
AIFS Arbitration Inter-Frame Spacing
AP Access Point
CA Collision Avoidance
CCA Clear Channel Assessment
CFP Contention-Free Period
CP Contention Period
CPE Customer Premises Equipment
CSMA Carrier Sense Multiple Access
DCA Dynamic Channel Allocation
DCF Distributed Coordination Function
MAC Medium Access Control
PC Point Coordinator
PCF Point Coordination Function
PHY Physical (Layer)
QoS Quality of Service
RRM Radio Resource Management
STA Station/Client
TCP Transmission Control Protocol
TDD Time Division Duplex Or Duplexing
TPC Transmit Power Control
TX Transmit or Transmitter or Transmission
VAP Virtual Access Point
WLAN Wireless LAN
WMM Wi-Fi Multimedia

BRIEF DESCRIPTION OF THE DRAWINGS

Further embodiments of the invention will be described with respect to the following figures, in which.

DETAILED DESCRIPTION

In the associated figures, identical reference signs denote identical or at least equivalent elements, parts, units or steps. In addition, it should be noted that all of the accompanying drawings are not to scale.

The technical solutions in the embodiments of the present invention are described clearly and completely in the following with detailed reference to the accompanying drawings in the embodiments of the present invention.

The described embodiments are only some embodiments of the present invention, rather than all embodiments. Based on the described embodiments of the present invention, all other embodiments obtained by persons of ordinary skill in the art without making any creative effort shall fall within the protection scope of the present invention.

Figure 1:
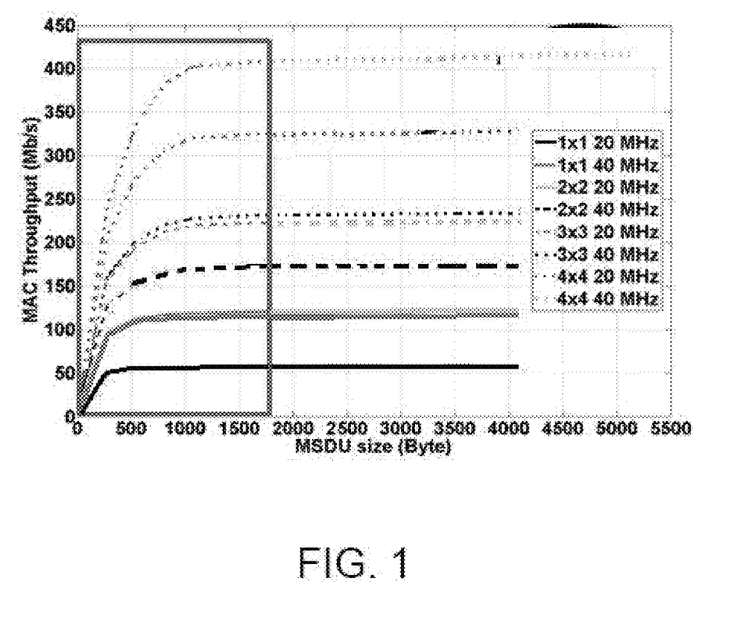
FIG. 1 shows a schematic two-dimensional representation diagram showing data rate vs. application datagram size for the IEEE 802.11 efficiency per fragment length for different frequencies for explaining the invention.

FIG. 1 shows a schematic two-dimensional representation diagram showing data rate vs. application datagram size for the IEEE 802.11 efficiency per fragment length for different frequencies for explaining the invention.

On the x-axis of the two-dimensional representation diagram in FIG. 1 The MAC Service Data Unit (MSDU) is the service data unit that is received from the logical link control (LLC) sub-layer which lies above the MAC sub-layer in a protocol stack. The LLC and MAC sub-layers are collectively referred to as the data link layer (DLL). The data rate as a function of the MSDU is plotted for various frequencies.

The grey box covering the MSDU from 0 to 1800 bytes in size covers the situation for most of the Internet Protocol (IP) networks.

IEEE 802.11 based WLANs may be used for internet applications such as email, file transfer, and web access (browsing). WLANs are also expected to support real-time applications such as audio and video.

The IEEE 802.11 WLAN standard defines two access methods: distributed coordination function (DCF) or basic access methods. The DCF is a CSMA protocol with CA (CSMA/CA). For a DCF, all the data traffic is transmitted on a first come first serve, best-effort basis.

PCF is a polling-based access method that uses a point coordinator (PC) to arbitrate access among stations. Handheld clients do not support PCF, and most customer premises equipment (CPE) clients do not support PCF.

The efficiency of IEEE 802.11 WLAN standards deteriorates due to protocol overheads, MAC, and physical layer (PHY). Overheads become more significant, especially with high rates, 54 megabits per second (Mbps) and above for the following reasons. IEEE 802.11 overheads have relatively fixed time duration regardless of the physical layer, and the rate data transmit time is shorter for higher data rates, up to 1.6.

Further reasons are given by the fact that both IEEE 802.11ac and IEEE 802.11n increase the efficiency by introducing data aggregation. Further, aggregation size decreases (shorter TX time) when the number of clients per cell increases and the number of collision increases until successful delivery of a fragment.

The collision probability is determined by the number of clients or stations (STA) and the $CW_{min}$ value used by back-off algorithm Adjusting initial random wait time, $CW_{min}$, to the number of STAs controls the collision probability with the following limitations. Larger number of clients associated with an access point requires increasing $CW_{min}$ value. High values of $CW_{min}$ result in longer transmit time due to longer wait time. Adjusting $CW_{min}$ for number of clients has limited control on the collision probability.

As shown in FIG. 1, the efficiency of the IEEE 802.11 protocol MAC and PHY layer depends on the frame transmit time, physical layer data rate and collision probability.

$$\text{Efficiency} = \frac{FrameTxTime}{(FrameTxTime + \text{Overheads})(1 + ExReTrans)} \quad \text{Equation 1}$$

$$FrameSize = DataRate \cdot \text{Accumulate Time} \quad \text{Equation 2}$$

$$FrameTxTime = \frac{FrameSize}{PhyRate} \quad \text{Equation 3}$$

The conditions for the above equations may be:
Regarding the frame size: The Transmitter, TX, frame size in bits
Concerning the data rate: the clients data rate in Mbps
For the accumulation Time: the delay between TX of two data frames in microseconds (µs)
Regarding the PHY rate: the PHY transmit rate in Mbps
Overheads: Expected Frame MAC and PHY overheads in µs
ExReTrans: Expected number of Retransmissions
From the equations above the efficiency of the 802.11 is:

$$\text{Efficiency} = \frac{1}{\left(1 + \frac{\text{Overheads} \cdot PhyRate}{DataRate \cdot AccummulateTime}\right)(1 + ExReTrans)} \quad \text{Equation 4}$$

It is evident from Equation 4 that the 802.11 protocol efficiency (PHY+MAC) is in direct proportion to the data rate and accumulation time and in inverse ratio to the PHY rate and collision probability.

$$DataRate = \frac{PhyRate \cdot \text{Efficiency}}{NumOfSta} \quad \text{Equation 5}$$

When the following is defined like:
NumOfSta: Number of active clients (per access point)
From the Overheads: Expected Frame MAC and PHY overheads in µs
ExReTrans: Expected number of Retransmissions
Derived from the equation 4 and 5, the efficiency of the IEEE 802.11 is:

$$\text{Efficiency} = \left(\frac{1}{1 + ExReTrans} - \frac{\text{Overhead} \cdot NumOfSta}{AccummulateTime}\right) \quad \text{Equation 6}$$

It is evident from Equation 6 that the IEEE 802.11 protocol efficiency (PHY+MAC) is in direct proportion to the data accumulate time and in inverse ratio to the number of stations, protocol overheads and expected number of re-transmission (or collision probability).

Figure 2:
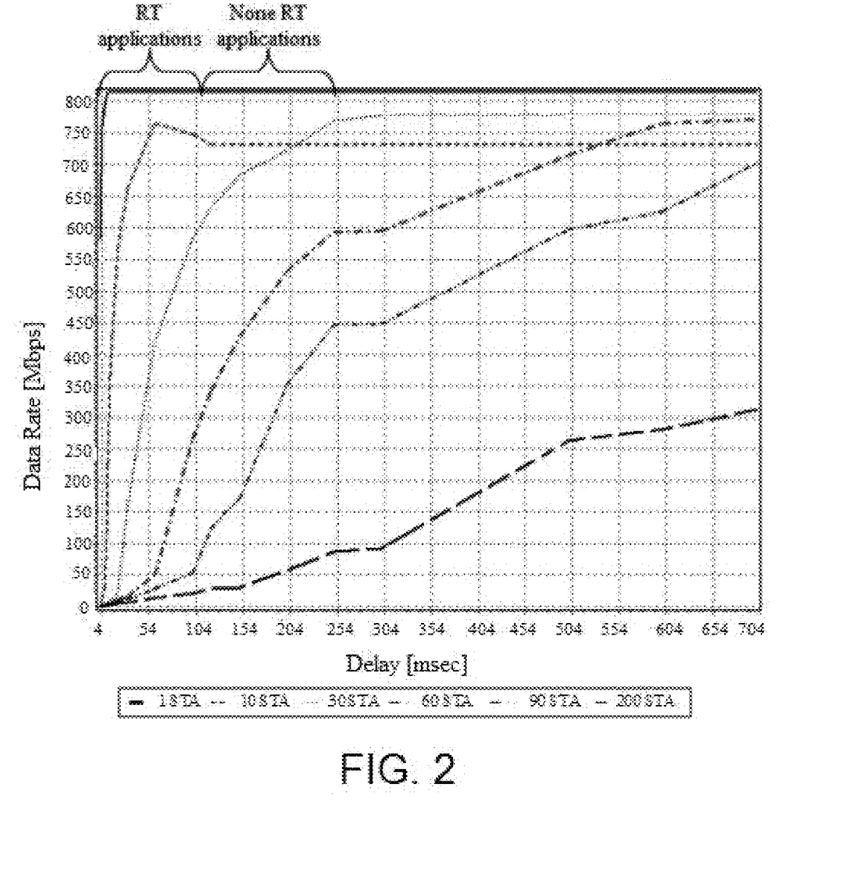
FIG. 2 shows a schematic two-dimensional representation diagram showing data rate vs. accumulate time for different number of clients for explaining the invention.

FIG. 2 shows a schematic two-dimensional representation diagram showing data rate vs. accumulate time for different number of clients (STA) for explaining the invention.

FIG. 2 visualizes the DCF protocol overhead problem. The factors that cause IEEE 802.11 link inefficiencies are listed in the following. Clients transmit data as soon as possible i.e., relatively short accumulated time (see equation 6), clients share the resources, for example PHY rate*efficiency. In a scenario of many clients associated with an access point, each client has low data rate, i.e., longer data delays, data delays cause Transmission Control Protocol (TCP)-based applications to reduce the data rate.

Different functions for 1, 10, 30, 60, 90, and 200 clients are plotted in the two-dimensional representation diagram of FIG. 2, showing data rate on the y-axis vs. the accumulate time, i.e. delay in, for example milliseconds, shown on the x-axis.

FIG. 2 also visualizes the DCF high collision probability problem. Automatically adjusting the $CW_{min}$ value to the number of clients associated with an access point decreases the collision probability and improves the protocol efficiency. The factors that (still) cause IEEE 802.11 high collision probabilities are the following. For over 80 clients associated to an access point (and active), the collision probability is high for any reasonable $CW_{min}$ value, accurately estimating the number of active clients per access point, accurately estimating the number of active clients per channel, for example sharing the same broadcast zone.

Figure 3:
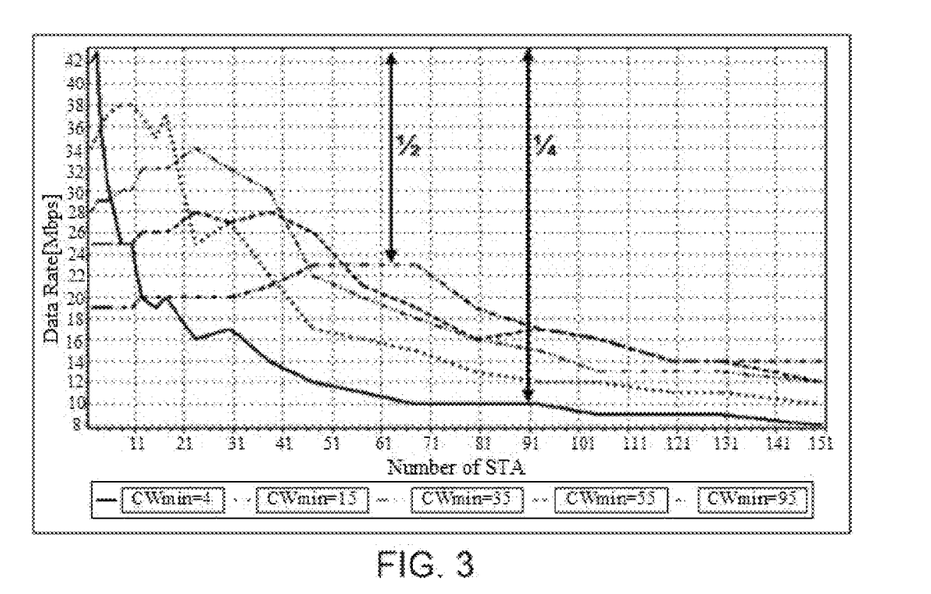
FIG. 3 shows a schematic two-dimensional representation diagram showing $CW_{min}$ vs data rate for explaining the invention.

FIG. 3 shows a schematic two-dimensional representation diagram showing $CW_{min}$ vs data rate for explaining the invention.

The x-axis denotes the clients or STA per access point, for example per all VAPs, and the y-axis shows the data rate in Mbps. Functions for various reasonable $CW_{min}$ values are presented, for example 4, 15, 35, 55, and 95.

The IEEE 802.11 defines a PCF mode to overcome the efficiency problem by reducing the collision probability. In PCF mode, the total air-time is divided into the contention-free period (CFP) and the contention period (CP).

During the CP, all devices access the medium using DCF mode. In PCF mode the access point is also the Point Coordinator (PC) of the cell and it ensures that during the CFP, the air medium is divided between STAs without the need for CSMA/CA mechanism i.e., using polling mode. Clients request bandwidth allocation in the uplink using DFC on the CP.

As shown in Equation 4, the efficiency of IEEE 802.11 depends on the frame transmit time, PHY data rate and collision probability. Although PCF improves the efficiency by reducing the collision probability, the protocol efficiency is still low when working with many STAs.

The following lists the factors that cause IEEE 802.11 link in-efficiencies: contention periods are still needed for bandwidth requests and clients that do not support PCF, few clients implementing PCF, PCF is not mandatory, clients share data rate, so in the scenario of many clients associated with an access point, each client has low data rate i.e., longer data delays, data delays cause TCP-based application to reduce data rate.

To overcome the efficiency problem of IEEE 802.11 STAs, a denser access point deployment is used. A Radio Resource Management (RRM) layer is added to manage the dense network (Dynamic Channel Allocation (DCA), Transmit Power Control (TPC) and Clear Channel Assessment (CCA)). Additional improvement is made by adding smart antenna (beam forming) techniques to high dense deployment. The disadvantages of this method are larger number of access points, higher cost, installation complexity, more hardware.

Figure 4:
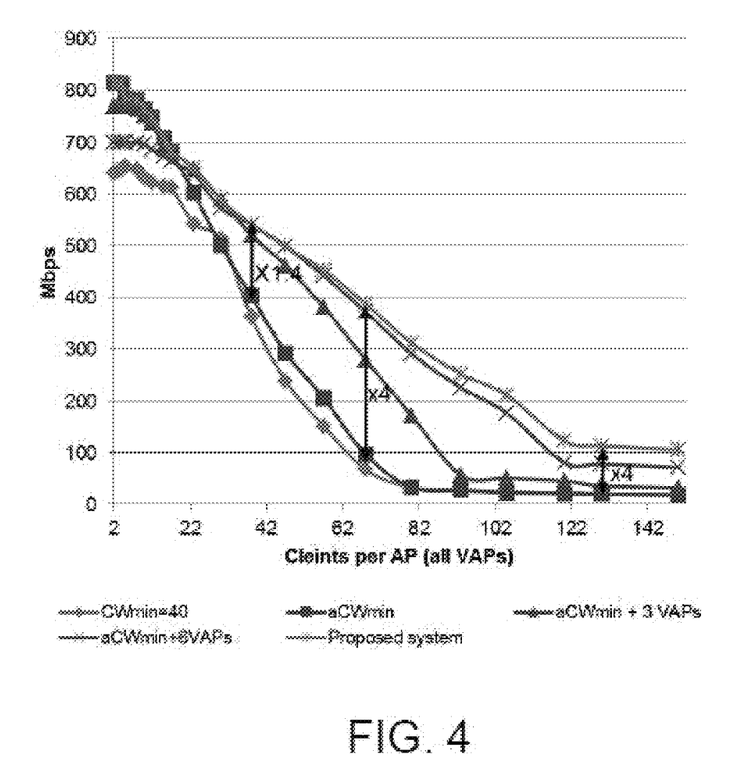
FIG. 4 shows a schematic two-dimensional representation diagram showing a performance comparison overview for explaining the invention.

FIG. 4 shows a schematic two-dimensional representation diagram showing a performance comparison overview for explaining the invention.

FIG. 4 shows the performance results of the method for providing an efficient multi-client access—top most line— versus basic Wi-Fi (no RRM, fixed $CW_{min}$) and $CW_{min}$ optimization—the further lines in the graph with lower performance.

FIG. 4 clearly shows that the method for providing an efficient multi-client access significantly outperforms basic Wi-Fi and adaptive $CW_{min}$. Below 15 active clients, for instance, a regular VAP implementation reduces the system efficiency.

The x-axis denotes the clients per access point, for example per all VAPs, and the y-axis shows the rate in Mbps.

For instance, above 60 access point clients per access point, the efficiency is above 50 percent (%) and results in four times better performance relative to an IEEE 802.11 implementation, indicated by the arrow denoted with x4.

Figures 5, 6:
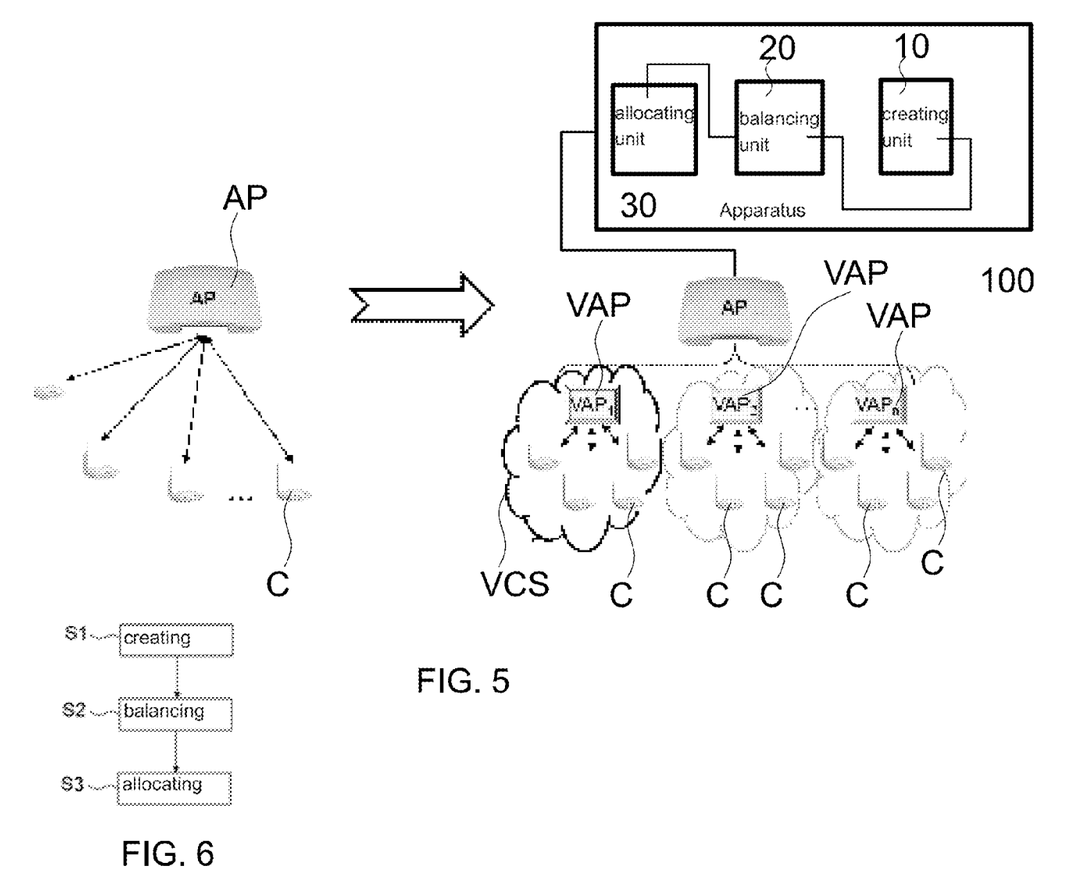
FIG. 5 shows an apparatus for providing an efficient multi-client access according to an embodiment of the invention.
FIG. 6 shows a block diagram of a method for providing an efficient multi-client access according to an embodiment of the invention.

FIG. 5 shows an apparatus for providing an efficient multi-client access according to an embodiment of the invention.

An apparatus 100 for providing an efficient multi-client access, the apparatus 100 may comprise a creating unit 10, a balancing unit 20, and an allocating unit 30.

The creating unit 10 may be configured to create at least two VAPs.

The balancing unit 20 may be configured to load balance by distributing workloads across the created at least two VAPs.

The allocating unit 30 may be configured to dynamically allocate at least one QoS parameter to each of the created at least two VAPs.

In FIG. 5, three VAPs are created out of one physical access point. Each of the three VAPs, for example $VAP_1$, $VAP_2$, . . . , and $VAP_N$, comprises a virtual client sphere (VCS) representing the group of clients associated with each of the VAPs. The VCS may be a cloud of associated access point clients.

Optionally, in one embodiment of the present invention, the apparatus 100 may be coupled to an access point. The apparatus 100 may be also integrated to an access point.

FIG. 6 shows a block diagram of a method for providing an efficient multi-client access according to an embodiment of the invention.

Optionally, in one embodiment of the present invention, the method for providing an efficient multi-client access may comprise the following steps.

As a first step of the method for providing an efficient multi-client access, creating S1 at least two VAPs is conducted.

As a second step of the method for providing an efficient multi-client access, load balancing S2 by distributing workloads across the created at least two VAPs is performed.

As a third step of the method for providing an efficient multi-client access, dynamically allocating S3 at least one QoS parameter to each of the created at least two VAPs is conducted.

Optionally, in one embodiment of the present invention, the method for providing an efficient multi-client access may comprise the following steps.

Creating a number N of VAPs. For example, eight VAPs are created. As a further step, conduct a load balancing of clients to achieve same or approximately an identical number of clients per VAP, same or approximately an identical traffic load per VAP.

Optimally, if more than for example 15 clients are active per VAP, dividing the VAPs into K VAP groups is performed, wherein K is smaller than or equal to N. Instead of 15 clients any other threshold value representing a maximum number of clients per access point or per VAP can be used. Dividing may be performed for example using the formula:

$$K=\lfloor 4.5 \ln(x)-9.8 \rfloor$$

where x is the number of access point clients per access point or per VAP.

As a further step of the method, dynamically allocating different QoS parameters is performed. For instance, as a QoS parameter the following parameters may be modified: time slot, arbitration inter-frame spacing, $CW_{min}$, $CW_{max}$, TXOP to each VAP group. The following criteria may serve for the modification: VAP priority, VAP weight, or VAP load and performance.

Optionally, in one embodiment of the present invention, TDD is achieved by setting different QoS parameter to the high priority VAP, i.e. selected TDD algorithm VAP.

The priority or QoS setting is defined and performed according to the following rules. Arbitration inter-frame spacing (AIFS) value is set per VAP; TDD selected (temporary prioritize) VAP—low AIFS value (1, 2, 3), other VAPs—high AIFS value (15—Priority) when Priority<15; $CW_{min}$ is set according to VAP access category (AC).

In addition, $CW_{min}$ depends on VAP division duplexing selected selection. TDD selected VAP—$CW_{min}$ is a function of VAP number of clients; other VAPs—according to (access point number of clients) (VAP weight); $CW_{max}$ is set according to VAP AC; in addition, depends on VAP division duplexing selected priority: division duplexing selected VAP—according to VAP number of clients; other VAPs—according to (AC group)*(VAP weight) TXOP divided according to AC and VAP priority.

Figure 7:
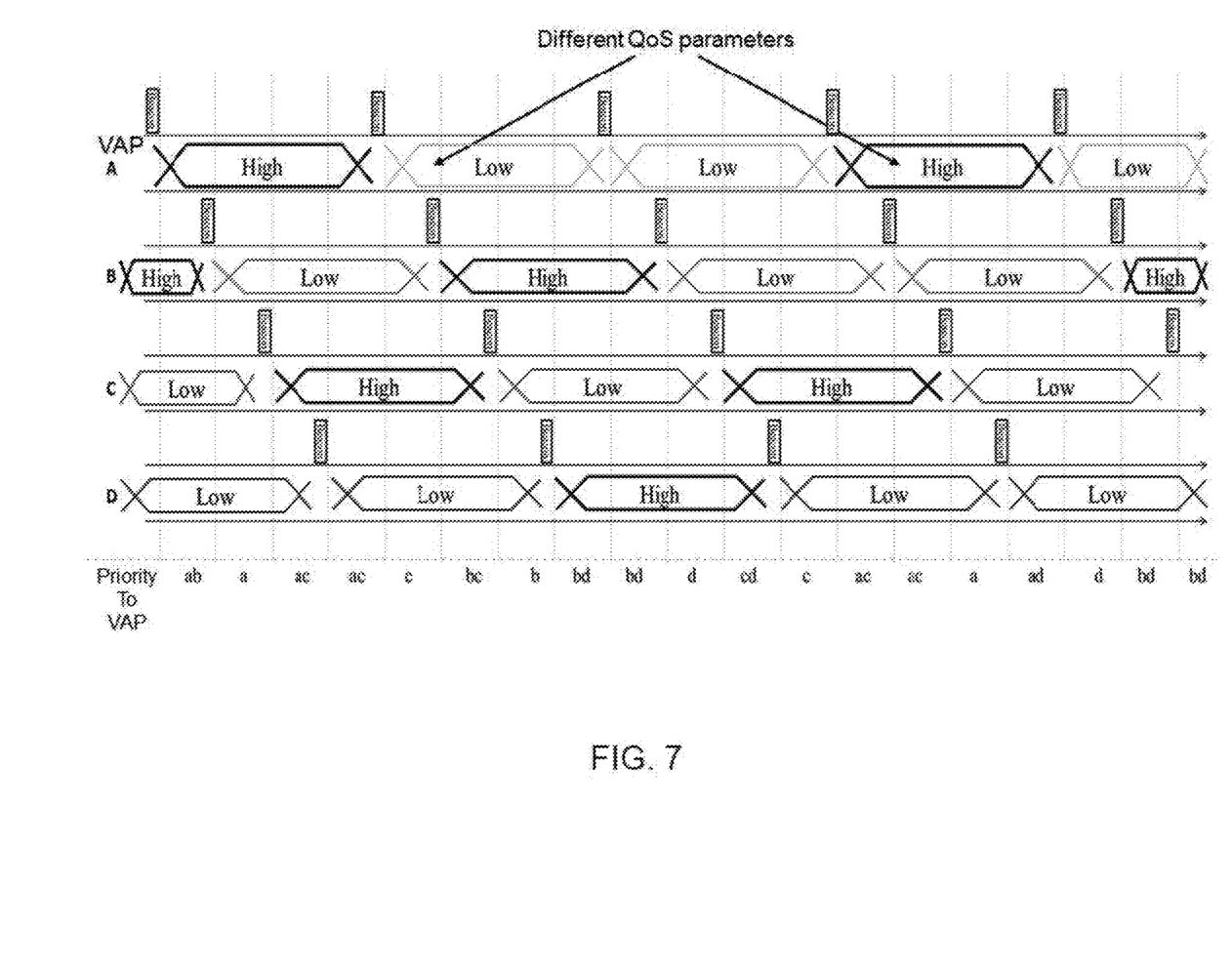
FIG. 7 shows a datagram structure diagram according to an embodiment of the invention.

FIG. 7 shows a datagram structure diagram according to an embodiment of the invention.

A channel access method or multiple access method allows several terminals connected to the same multi-point transmission medium to transmit over it and to share its capacity.

FIG. 7 shows a datagram structure diagram of wireless data transmission of four access point clients or terminals, denoted by A, B, C, and D of one VAP. Each access point client has high priority data packets and low priority data packets, denoted high and low, respectively.

Beacon frames as management frames in IEEE 802.11 based WLANs are transmitted between the high priority data packets and low priority data packets. The beacon frames contain all the information about the network. Beacon frames are transmitted periodically to announce the presence of a WLAN. Beacon frames are transmitted by the VAP.

Figure 8:
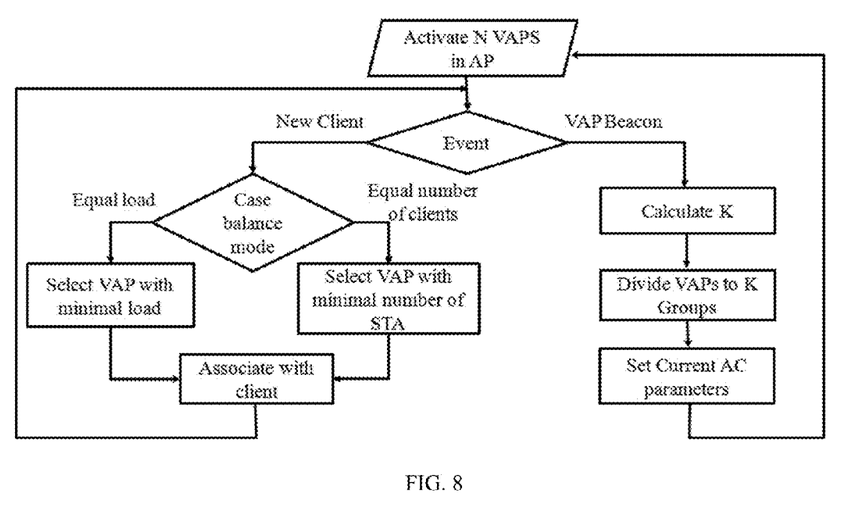
FIG. 8 shows a block diagram of a method for providing an efficient multi-client access according to a further embodiment of the invention.

FIG. 8 shows a block diagram of a method for providing an efficient multi-client access according to a further embodiment of the invention.

Optionally, in one embodiment of the present invention, the method for providing an efficient multi-client access initially starts with an activation of N VAPs. Subsequently, the method divides into two alternatives.

Particularly, two branches are visualized in the block diagram of the method. On the left side, the occurrence of a new client triggers a case balance mode. On the right side, a VAP beacon triggers a calculation of the number K, for example the number of VAPs.

Subsequently, the case balance mode is separated into two branches, one for equal load and one for equal number of clients. In case of equal load, the VAP with the minimal load is selected, for the case of an equal number of clients, the VAP with the minimal number of clients STA is selected. In any case, the selected VAP is subsequently associated with the client.

The second branch, regarding the branch calculating the number K, after the calculation is performed a dividing of the VAPs into K groups is performed. Finally, the new parameters are set.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein.

While the present invention has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method for providing an efficient multi-client access, the method comprising:
   creating at least two virtual access points (VAPs);
   load balancing by distributing workloads across the VAPs; and
   dynamically allocating at least one quality of service (QoS) parameter to each of the VAPs,
   wherein distributing the workloads across the VAPs is achieved by adjusting a number of access point clients per each of the VAPs,
   wherein a threshold value is defined for the number of access point clients per each of the VAPs, and
   wherein a new VAP is created when the threshold value regarding the number of access point clients per each of the VAPs is exceeded.

2. The method according to claim 1, wherein distributing the workloads across the VAPs is further achieved by adjusting a cell traffic load of each of the VAPs.

3. The method according to claim 1, wherein dynamically allocating the QoS parameter comprises adjusting a time slot of one of the VAPs.

4. The method according to claim 1, wherein dynamically allocating the QoS parameter comprises adjusting an arbitration inter-frame spacing of one of the VAPs.

5. The method according to claim 1, wherein dynamically allocating the QoS parameter comprises adjusting a minimum contention window for one of the VAPs.

6. The method according to claim 1, wherein dynamically allocating the QoS parameter comprises adjusting a maximum contention window for one of the VAPs.

7. The method according to claim 1, wherein dynamically allocating the QoS parameter comprises adjusting a transmission opportunity as an interval of time for one of the VAPs.

8. The method according to claim 1, wherein dynamically allocating the QoS parameter to one of the at least two VAPs is conducted according to a priority value.

9. The method according to claim 1, wherein dynamically allocating the QoS parameter to one of the at least two VAPs is conducted according to a weight value.

10. The method according to claim 1, wherein dynamically allocating the QoS parameter to one of the at least two VAPs is conducted according to a load and performance value.

11. An apparatus for providing an efficient multi-client access, the apparatus comprising:
- a memory comprising instructions; and
- a processor coupled to the memory, wherein when executing the instructions, the processor is configured to:
  - create at least two virtual access points (VAPs);
  - load balance by distributing workloads across the VAPs; and
  - dynamically allocate at least one quality of service parameter to each of the VAPs,
- wherein distributing the workloads across the VAPs is achieved by adjusting a number of access point clients per each of the VATPs,
- wherein a threshold value is defined for the number of access point clients per each of the VAPs, and
- wherein a new VAP is created when the threshold value regarding the number of access point clients per each of the VAPs is exceeded.

12. An access point for use in a communication network comprising:
- an apparatus for providing an efficient multi-client access, the apparatus comprising:
  - a creating unit configured to create at least two virtual access points (VAPs);
  - a balancing unit configured to load balance by distributing workloads across the VAPs; and
  - an allocating unit configured to dynamically allocate at least one quality of service (QoS) parameter to each of the VAPs,
- wherein distributing the workloads across the VAPs is achieved by adjusting a number of access point clients per each of the VAPs,
- wherein a threshold value is defined for the number of access point clients per each of the VAPs, and
- wherein a new VAP is created when the threshold value regarding the number of access point clients per each of the VAPs is exceeded.

13. The apparatus according to claim 11, wherein distributing the workloads across the VAPs is further achieved by adjusting a cell traffic load of each of the VAPs.

14. The access point according to claim 12, wherein distributing the workloads across the VAPs is further achieved by adjusting a cell traffic load of each of the VAPs.

* * * * *

UNITED STATES PATENT AND TRADEMARK OFFICE
CERTIFICATE OF CORRECTION

PATENT NO.          : 10,009,280 B2
APPLICATION NO.     : 14/985978
DATED               : June 26, 2018
INVENTOR(S)         : Avi Weitzman et al.

Page 1 of 1

It is certified that error appears in the above-identified patent and that said Letters Patent is hereby corrected as shown below:

In the Claims

Column 11, Line 30: Claim 11, "VATPs" should be "VAPs"

Signed and Sealed this
Twenty-first Day of August, 2018

Andrei Iancu
*Director of the United States Patent and Trademark Office*